United States Patent
Iwami

(10) Patent No.: US 6,846,879 B2
(45) Date of Patent: Jan. 25, 2005

(54) GOLF BALL

(75) Inventor: Satoshi Iwami, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 51 days.

(21) Appl. No.: 10/345,156

(22) Filed: Jan. 16, 2003

(65) Prior Publication Data

US 2003/0158339 A1 Aug. 21, 2003

(30) Foreign Application Priority Data

Jan. 28, 2002 (JP) .................................. 2002-018175

(51) Int. Cl.$^7$ .............................................. A63B 37/12
(52) U.S. Cl. ...................... 525/179; 525/184; 525/274; 473/378; 473/385
(58) Field of Search ................... 525/179, 184, 525/274; 473/378, 385

(56) References Cited

U.S. PATENT DOCUMENTS

| | | | |
|---|---|---|---|
| 4,955,966 A | * | 9/1990 | Yuki et al. ................... 473/359 |
| 5,697,856 A | | 12/1997 | Moriyama et al. |
| 5,716,293 A | | 2/1998 | Yabuki et al. |
| 5,935,021 A | | 8/1999 | Kashiwagi et al. |
| 2002/0045501 A1 | * | 4/2002 | Takemura et al. .......... 473/378 |

FOREIGN PATENT DOCUMENTS

| | | |
|---|---|---|
| JP | 62-64378 A | 3/1987 |
| JP | 63-9461 A | 1/1988 |
| JP | 1-223980 A | 9/1989 |
| JP | 6-319832 A | 11/1994 |
| JP | 10-179802 A | 7/1998 |
| JP | 10-225532 A | 8/1998 |
| JP | 2001-70478 A | 3/2001 |

OTHER PUBLICATIONS

Yamamoto et al., Nihon Reoroji Gakkaishi vol. 25, No. 5, 1997, pp. 275–282.

* cited by examiner

*Primary Examiner*—David J. Buttner
(74) *Attorney, Agent, or Firm*—Birch, Stewart, Kolasch & Birch, LLP

(57) ABSTRACT

A golf ball providing resistance to abrasion and resistance to wear generally in an excellent balance is formed of a core and a cover arranged to cover the core, the cover being formed of a compound containing relative to 100 parts by mass of a polymer component thereof composed mainly of polybutadiene rubber 1–40 parts by mass of a reinforcement material formed of organic short fiber and 10–40 parts by mass of a metallic salt of $\alpha,\beta$-ethylene unsaturated carboxylic acid. It is characterized in that the organic short fiber is suitably a ternary composite formed of a rubber component, a polyolefin component and a nylon component and the metallic salt of $\alpha,\beta$-ethylene unsaturated carboxylic acid is suitably zinc acrylate, zinc methacrylate, magnesium acrylate or magnesium methacrylate.

7 Claims, No Drawings

GOLF BALL

BACKGROUND OF THE INVENTION

1. Field of the Invention

The present invention relates to golf balls maintaining rebound performance and also providing improved resistance to abrasion and improved resistance to wear in an excellent balance.

2. Description of the Background Art

Conventionally, a golf ball having a thread-wound layer formed at a liquid center and a balata cover covering thereof has widely been used by advanced golfers and professional golfers as being excellent in shot feel and controllability. Such a golf ball, however, has a structure that makes the manufacturing process complicated, and is poor in durability and resistance against abrasion.

On the other hand, ionomer resin is excellent in rebound performance, durability, resistance to wear and workability and it is widely used as a covering material. Ionomer resin, however, is stiff and hard and provides uncomfortable feel, impaired spin performance, and poor controllability. Accordingly, covering materials have been developed to provide golf balls with improved, required characteristics which are well balanced.

Japanese Patent Laying-Open No. 62-64378 proposes a cover composition for a golf ball where a fine fiber having an amide group is blended in a cover material containing trans-polyisoprene as a main component to improve rebound property, spin property and cut resistance.

Japanese Patent Laying-Open No. 63-9461 proposes a cover composition for a golf ball where 5–42 parts by mass of trans-polybutadiene, 1–15 parts by mass of fine fiber having an amide group, and 5–30 parts by mass of natural rubber are blended in 100 parts by mass of a cover material containing trans-polyisoprene as a main component, as a cover material that realizes the best possible performance, that is, a flight distance of a multi-dimple type golf ball.

Japanese Patent Laying-Open No. 1-223980 proposes a thread-wound golf ball using a cover material where inorganic single crystal fibers are blended in a trans-1,4-polyisoprene-based cover material to improve a flight distance of the ball.

U.S. Pat. No. 5,716,293 discloses the use of a solid rubber center containing an oily material and a soft cover material to improve a shot feel and to increase a spin amount with a short iron as well. Since this technique uses an oil proof rubber or an ionomer resin having a high hardness for the outer side of the solid rubber center, the rebound performance and the shot feel is yet to be improved.

U.S. Pat. No. 5,935,021 proposes a technique to improve rebound property, durability and cut resistance by blending fibrous aluminum borate whiskers in a main material of a thermoplastic resin or a thermoplastic elastomer. This technique, however, reduces the rebound performance of the cover material by blending the aforementioned whiskers.

Japanese Patent Laying-Open No. 10-179802 proposes a golf ball where a base resin of a cover is formed of a two-component heated mixture, as a main component, of an ionomer resin and a styrene-butadiene-styrene block copolymer having a polybutadiene block containing an epoxy group or a styrene-isoprene-styrene block copolymer having polyisoprene block containing an epoxy group, characterized in that the composition forming the cover has a flexural modulus of 50–300 MPa and a Shore D hardness of 40–60. This technique is intended to improve the shot feel, the spin performance and the flight performance, but the cut resistance is still to be improved.

Japanese Patent Laying-Open No. 10-225532 proposes a cover composition for a golf ball formed of a resin composition in which aluminum borate whiskers are blended in a resin material made of an ionomer resin as a base material to improve durability.

Japanese Patent Laying-Open No. 6-319832 proposes a composition as a cover material formed by blending a core shell polymer made of (a) a core of a rubber-like polymer having an epoxy group or a carboxyl group or an acid anhydride group on the surface and (b) a shell of a glassy polymer, into an ethylene-unsaturated carboxylc acid copolymer, to improve a soft feeling and durability as well as rebound performance.

Japanese Patent Laying-open No. 2001-70478 proposes for a covering material a rubber compound formed of polybutadiene having a cis 1,4 structure content of at least 40% with 5 to 40% by weight of $\alpha,\beta$-ethylene unsaturated carboxylic acid, 5 to 40 weight of a metal oxide, and 0.1 to 5 parts by weight of a polymerization initiator blended therewith. However, it is not satisfactory in resistance to wear, resistance to abrasion, and rebound performance.

The Journal of the Society of Rheology, Japan, Vol. 25 (1997) has reported a development of a micro disperse system super-fine fiber reinforced composite prepared from a rubber-polyolefin-nylon ternary graft copolymer as an application of the plastic field.

Note that U.S. Pat. No. 5,697,856 discloses that a golf ball has a core formed using polybutadiene rubber as a rubber base material and containing a cis 1,4 structure content of no less than 90% prior to vulcanization and a trans structure content of 10 to 30% after vulcanization and the core also has a hardness decreasing in difference in the direction of the depth.

These conventional techniques cannot improve the rebound performance, the spin performance, the cut resistance, durability, and feeling on the whole.

SUMMARY OF THE INVENTION

The present invention relates to a golf ball maintaining rebound performance and also providing improved resistance to abrasion and improved resistance to wear in an excellent balance.

The present invention provides a golf ball formed of a core and a cover disposed to cover the core, characterized in that the cover contains relative to 100 parts by mass of a polymer component thereof composed mainly of polybutadiene rubber 1–40 parts by mass of a reinforcement material formed of organic short fiber and 10–40 parts by mass of a metallic salt of $\alpha,\beta$-ethylene unsaturated carboxylic acid. The organic short fiber is preferably a ternary composite formed of a rubber component, a polyolefin component and a nylon component. Furthermore the metallic salt of $\alpha,\beta$-ethylene unsaturated carboxylic acid is preferably zinc acrylate, zinc methacrylate, magnesium acrylate or magnesium methacrylate.

DESCRIPTION OF THE PREFERRED EMBODIMENTS

The present invention is a golf ball formed of a core and a cover disposed on the core, the cover containing a polymer component composed mainly of polybutadiene rubber.

Polymer Component

The present golf ball's cover can be formed using polybutadiene rubber having a cis-1,4 structure content of at least 40% as a polymer component in the form of a single substance. It can also be formed of such polybutadiene rubber with no more than 90% by mass of transpolyisoprene, natural rubber, styrene-butadiene rubber, polyisoprene rubber, chloroprene rubber, butyl rubber, ethylene-propylene rubber, ethylene-propylene-diene rubber, acrylicnitrile rubber or the like mixed therewith. The polymer component means a component of a base material of the cover and is not intended to include the reinforcing organic short fiber and ternary composite descried later.

Co-Crosslinking Agent

The cover's formulation includes zinc acrylate, zinc methacrylate, magnesium acrylate, magnesium methacrylate or any other similar metallic salt of $\alpha,\beta$-ethylene unsaturated carboxylic acid as a co-crosslinking agent. The co-crosslinking agent may alternatively be a metallic salt of $\alpha,\beta$-ethylene unsaturated carboxylic acid produced by blending acrylic acid, methacrylic acid or any other similar $\alpha,\beta$-ethylene unsaturated carboxylic acid and a metal oxide each into a rubber compound and allowing them to react with each other while they are kneaded.

If the metallic salt of the $\alpha,\beta$-ethylene unsaturated carboxylic acid is used, 10–40 parts by mass thereof is preferably blended relative to 100 parts by mass of the polymer component. On the other hand, if the $\alpha,\beta$-ethylene unsaturated carboxylic acid and a meal oxide are each blended into a rubber compound and allowed to react with each other while they are kneaded, then relative to 100 parts by mass of the polymer component 15–30 parts by mass of $\alpha,\beta$-ethylene unsaturated carboxylic acid is preferably blended and relative to that $\alpha,\beta$-ethylene unsaturated carboxylic acid 20–35% by mass of zinc oxide, magnesium oxide or any other similar metal oxide is preferably blended.

Crosslink Initiator

An organic peroxide, for example, dicumyl peroxide, 1,1-bis (t-butyl peroxy) 3,3,5-trimethylcyclohexane, 1,1-bis (t-hexylperoxy) cyclohexane, t-butylperoxybenzoate, t-butylcumylperoxide or the like is used as a cross-linking initiator. 0.1–5 parts by mass, preferably 0.3–3 parts by mass of the initiator is blended relative to 100 parts by mass of diene rubber.

Condition for Crosslinking Reaction

The above rubber compound can be crosslinked by a conventional method. It is crosslinked by being heated once at 120 to 180 degrees centigrade for 5 to 60 minutes. It can also be heated in two steps so that it can be crosslinked uniformly. For example at the first step it is heated at 135 to 155 degrees centigrade for 20 to 50 minutes and at the second step it is heated at 160 to 180 degrees centigrade for 5 to 20 minutes.

Organic Short Fiber

An organic short fiber, for example, a nylon fiber, an acrylic fiber, a polyester fiber, an aramid fiber, or the like can be used in the cover composition of the present invention. In this case, the cut resistance can be improved without reducing the rebound performance.

The organic short fiber has a length in the range of 5 $\mu$m–10 mm, preferably 100 $\mu$m to 5 mm, and a diameter in the range of 0.5 to 100 $\mu$m, preferably 1 to 30 $\mu$m. If the length of the organic short fiber does not satisfy the aforementioned range, the strength is not increased because of weakness in a flexural direction and the cut resistance cannot be improved. If the diameter of the organic short fiber does not satisfy the aforementioned range, it merely acts as a filler. On the other hand, if the length and diameter of the organic short fiber exceeds the aforementioned range, the cover's compound is increased in viscosity and deteriorated in moldability. It is noted that the organic short fiber described above is referred to as a concept including a fiber that is finely cut into pulp.

The blended amount of the organic short fiber is in the range of 0.5 to 20 parts by mass with respect to 100 parts by mass of the polymer component of the cover. If less than 0.5 part by mass, the effect resulting from the blended organic short fiber is reduced. If more than 20 parts by mass, the cover composition is increased in viscosity and deteriorated in moldability, and is susceptible to breakage. It is noted that if a short fiber-reinforced rubber is used, the rubber is included in the polymer component and the blended amount of the organic short fiber is set in the aforementioned range.

Mixture of Ternary Composite

In the present invention for the organic short fiber a ternary composite can be used. The ternary composite is formed of the three components of a rubber component, a polyolefin component and a nylon component. These three components are chemically bound with each other to form a composite material where the fine nylon component is evenly distributed in a matrix of the rubber component and the polyolefin component.

The rubber component is limited to those which does not undergo gelation at a high temperature at the time of kneading and reaction with nylon and spinning, such as natural rubber, polyisoprene, ethylene-propylene-diene rubber (EPDM), nitrile-butadiene rubber (NBR), hydrogenated NBR (H-NBR). Ethylene-propylene-diene rubber (EPDM) is particularly suitable.

A low-density polyethylene, a high-density polyethylene, polypropylene is used as the polyolefin component, and polypropylene is particularly preferable.

Nylon 6, nylon 66, nylon 11, nylon 12 is used as the nylon component. Nylon 6 is particularly preferable. The ratio of these combined components may be adjusted as appropriate depending on the required characteristics of the golf ball cover material. This ternary composite is developed by Ube Industries, is known under the trade name of SHP sold by Daiwa Polymer, and has the following grades according to the composition ratio:

PA3060:
    EPDM/PP/nylon 6=100/100/100;
HA1060:
    NR/HDPE/nylon 6=100/75/87;
LA1060:
    NR/LDPE/nylon 6=100/75/87;
LA3080:
    EPDM/LDPE/nylon 6=100/40/105;
LA5060:
    H-NBR/LPDE/nylon 6=100/100/100; and
Z040NB:
    NBR/LPDE/nylon 6=100/75/75 where NR is natural rubber, HDPE is a high-density polyethylene, LDPE is a low-density polyethylene, NBR is acrylonitrile-butadiene rubber, and H-NBR is a hydrogenated NBR. The composition ratio is expressed by parts by mass.

It is noted that the average diameter of the nylon fiber used in the ternary composite is normally not more than 10 $\mu$m and preferably in the range of 0.05–1 $\mu$m. In the matrix of the ternary composite, the polyolefin component (for example HDPE) forms a continuous phase.

The ternary composite (for example SHP) is normally manufactured in the following three steps:

(1) kneading and reaction of the rubber component and the polyolefin component;

(2) kneading and reaction of the rubber component, the polyolefin component and nylon; and (3) spinning.

First of all, the rubber, the polyolefin and a reaction agent are introduced in a closed kneader to obtain a kneading and reaction product. Here a sea-island structure is formed where the polyolefin is the sea and the rubber is the island. This kneading and reaction product as well as the nylon are fed into a twin-shaft extruder with a reaction agent to obtain a ternary graft polymer of rubber-polyolefin-nylon, that is, a ternary composite. By adjusting a graft rate, the nylon is evenly distributed in the rubber-polyolefin matrix, for example, as particles of 2–3 µm.

Thereafter the product is extruded from a nozzle installed at the end of the twin-shaft extruder and drawn with draft. Through this spinning step, the nylon particles in the extruded product strand are deformed and converted into a fiber-like product. The nylon fiber diameter is normally controlled in the range of 0.2–0.3 µm, in consideration of the productivity, depending on a draft ratio. Since the polyolefin phase forms the sea in these steps, the viscosity is reduced to enable pelletization.

It is noted that the ternary composite used in the present invention is manufactured based on the description in the Journal of the Rheology Society, Japan, Vol. 25 (1997) pp. 275–282, where the composition can be further adjusted.

Mixture of Polymer Component and Ternary Composite

In the present invention 1–30 parts by mass of the ternary composite is blended relative to 100 parts by mass of the polymer component. Preferably 2–25 parts by mass, more preferably 5–20 parts by mass of the ternary composite is blended. In this case, the content of nylon component included in the ternary composite affects the reinforcing effect of the cover. If the blended amount of the ternary composite is less than one part by mass, the nylon short fiber has a less reinforcing effect. If the blended amount exceeds 30 parts by mass, the hardness of the cover is increased and the elastic modulus is reduced. Preferably the ternary composite contains 0.3 to 16.5% by mass of the nylon component relative to the cover's polymer component.

The ternary composite is used to prepare a cover composition, as follows: the polymer component and the ternary composite, e.g., SHP are introduced into a closed kneader and kneaded. At that point, a kneading temperature has to be lower than a melting point of the nylon component in the ternary composite. If the temperature is higher than the melting point of the nylon component, the fiber is melted and the reinforcement by the fiber is lost. If the kneading temperature is lower than the temperature of the polyolefin, however, the ternary composite is not distributed in the rubber and remains in pellets. During this kneading, a phase transition of the polyolefin and the rubber takes place in the matrix, and the polyolefin is finely distributed in the rubber. The other blended agent is thereafter added and mixed, resulting in a cover composition. When the ternary composite is being mixed together or after it has been mixed, the blended agents as described above are mixed using a roll, a kneader, a Banbury, and the like and subjected to vulcanization using a mold under pressure at 145° C. to 200° C., preferably at 120° C. to 175° C. for 10–40 minutes to produce the cover composition.

Other Agents Blended for Cover

The cover composition described above may be blended with a filler, a pigment such as titanium dioxide, a dispersant, an antioxidant, a ultraviolet absorber, a photostabilizer, a fluorescent material or a fluorescent brightening agent, and the like, as necessary, in such a range that cannot impair the desired characteristics of the golf ball cover. The filler can be one or more of inorganic powder of barium sulfate, calcium carbonate, clay, zinc oxide, and the like. Preferably, 5–50 parts by mass of the filler is blended relative to 100 parts by mass of the polymer component. In addition, for the purpose of improving workability, hardness adjustment, and the like, a softener, a liquid rubber, and the like may be blended as appropriate.

Structure and Characteristics of Cover

In the present invention the cover is formed of a single layer or a plurality of layers. The cover has a thickness adjusted to range from 0.3 to 3 mm, preferably 0.5 to 2.0 mm, more preferably 0.7 to 1.5 mm. Furthermore the cover has a shore D hardness adjusted to range from 30 to 55, preferably 35 to 52, more preferably 38 to 50 to provide an optimized feel at impact. Furthermore the cover's specific gravity is set to range from 0.98 to 1.2, preferably 1.05 to 1.15, to adjust spin rate.

Rubber Compound of Core

The present golf ball's core is formed of a rubber compound containing co-crosslinked diene rubber, and the diene rubber includes polybutadiene rubber having a cis-1,4 structure, natural rubber, styrene-butadiene rubber, isoprene rubber, chloroprene rubber, ethylene-propylene-diene rubber, acrylicnitrile rubber, although a rubber compound composed mainly of high cis polybutadiene rubber is most preferable.

In the rubber compound described above, a metallic salt of $\alpha,\beta$-ethylene unsaturated carboxylic acid such as zinc acrylate and zinc methacrylate, as described above, as well as a multi-functional monomer, N,N'-phenylbismaleimide, sulfur, and the like is used as a cross-linking agent. In particular, the metallic salt of the $\alpha,\beta$-ethylene unsaturated carboxylic acid is suitably used.

If the metallic salt of the $\alpha,\beta$-ethylene unsaturated carboxylic acid is used, for example, the blended amount thereof is preferably 5–40 parts by mass with respect to 100 parts by mass of diene rubber. On the other hand, if the $\alpha,\beta$-ethylene unsaturated carboxylic acid is reacted with a metal oxide during the preparation of the rubber compound, the blended amount relative to 100 parts by mass of the rubber component is preferably 15–30 parts by mass of $\alpha,\beta$-ethylene unsaturated carboxylic acid and 10–35 parts by mass of the metal oxide such as zinc oxide with respect to the $\alpha,\beta$-ethylene unsaturated carboxylic acid.

One or more of inorganic powder of barium sulfate, calcium carbonate, clay, zinc oxide, and the like can be used as the filler used in the rubber compound described above. Furthermore, an organic peroxide, for example, dicumyl peroxide, 1,1-bis(t-butyl peroxy)3,3,5-trimethylcyclohexane or the like is used as the cross-linking initiator. The blended amount of the cross-linking initiator is preferably 0.1–5 parts by mass, particularly 0.3–3 parts by mass with respect to 100 parts by mass of diene rubber.

In accordance with the present invention, the core as described above may be of a single layer or of a multi-layer having different characteristics such as specific gravity and hardness. In this case, the formulation of the core is not limited to the formulation as described above.

Characteristics of Core

Furthermore the present golf ball can employ a thread-wound core and a solid core. When the solid core is compressed under a load of 98N (10 kg) to 1275N (130 kg) it deforms preferably in a range of 2.5 to 5.0 mm, more preferably 2.8 to 4.5 mm. If less than 2.5 mm, the shot feel tends to be deteriorated. On the other hand, if more than 5.0, the rebound property is adversely effected. The solid core is designed to have a diameter in a range of 36.8–42.2 mm, preferably 37.8–41.4 mm. If less than 36.8 mm, the thickness of the cover layer is increased and the rebound property is reduced. On the other hand, if more than 42.2 mm, the thickness of the cover layer is reduced and the molding becomes difficult.

Multi-Layered Core

In the present invention the core can be formed of a single layer as well as a plurality of layers. The multi-layered core can have an outermost layer contacting a cover and formed using a polymer compound corresponding to the aforementioned rubber compound used for the core as well as thermoplastic resin, thermoplastic elastomer, ionomer resin, the composition used for the cover, or a mixture thereof.

The thermoplastic resin can be thermoplastic olefin resin, e.g., polyethylene, polypropylene, polystyrene, ABS resin, acrylic resin and methacryl resin, and furthermore polyamide resin, polyurethane resin, polyester resin.

The thermoplastic elastomer includes thermoplastic polyurethane elastomer, thermoplastic polyester elastomer, thermoplastic polyamide elastomer, and thermoplastic olefin elastomer.

The thermoplastic polyurethane elastomer is formed of a hard segment of a urethane structure and a soft segment of polyester or polyether. Listed as trade names are Miractran from Nippon Miractran Co., Ltd., Pandex from Dainippon Ink & Chemicals, Paraprene from Nippon Polyurethane Industry Co., Ltd., Pellethan from Dow Chemical Japan Limited, Elastollan from BASF Polyurethane Elastomers Ltd.

The thermoplastic polyester elastomer is formed of a hard segment of a polyester structure and a soft segment of polyether or polyester. Listed as trade names are Hytrel from Du Pont-Toray Co., Ltd., Pelprene P. S from Toyobo Co., Grilux E from Dainippon Ink & Chemicals, Primalloy from Mitsubishi Chemical Corporation, and the like.

The thermoplastic polyamide elastomer is formed of a hard segment of polyamide and a soft segment of polyether or polyester. Listed as trade names are Pebax from Toray Industries Ltd., Daiamid PAE from Daicel-Degussa Ltd., Grilux A from Dainippon Ink & Chemicals, Novamid PAE from Mitsubishi Engineering-Plastics Corporation, UBE-PAE from Ube Industries, Grilon ELX and Grilamid ELY from EMS Japan, S-TPAE from Sekisui Chemical Corporation, and the like.

The thermoplastic olefin elastomer is referred to as a concept including an olefin unit in a molecular chain, a so-called thermoplastic styrene elastomer, and includes a block copolymer having a soft segment and a hard segment in the molecule. The soft segment is a unit such as a butadiene block or an isoprene block derived from a conjugated diene compound. As the conjugated diene compound, for example, one or two or more kinds can be selected from butadiene, isoprene, 1,3-pentadiene, 2,3-dimethyl-1,3-butadiene, and the like, and butadiene, isoprene and the combination thereof are particularly preferable among others. The component that forms a hard segment includes a polyethylene block, a polypropylene block or a styrene block. They are derived from ethylene, propylene, styrene, and a derivative of styrene, for example, a compound formed by selecting one or two or more kinds from α-methylstyrene, vinyltoluene, p-tertiary butylstyrene and the like.

The thermoplastic styrene elastomer includes, for example, a styrene-isoprene-butadiene-styrene block copolymer (SIBS structure), a styrene-butadiene-styrene block copolymer (SBS structure), styrene-ethylene-butylene-styrene block copolymer corresponding to the hydrogenated double bonded portion of the butadiene thereof (SEBS structure), styrene-isoprene-styrene block copolymer (SIS structure), styrene-ethylene-propylene-styrene block copolymer corresponding to the hydrogenated double bonded portion of that isoprene (SEPS structure), and a modified product thereof, and the like.

The ionomer resin is, for example, a binary copolymer of an α-olefin and an α,β-unsaturated carboxylic acid having 3–8 carbon atoms, that is produced by neutralizing at least a part of the carboxyl group with metal ion. Also listed is a ternary copolymer of an α-olefin, an α,β-unsaturated carboxylic acid having 3–8 carbon atoms, and an α,β-unsaturated carboxylate having 2–22 carbon atoms, that is produced by neutralizing at least a part of the carboxyl group with metal ion.

In the present invention the core's outermost layer can be formed using a polymer compound with the ternary composite (e.g., SHP) mixed together. They are introduced into a sealed kneader and kneaded therein. It should be noted that they are kneaded at a temperature lower than a melting point of the nylon component in the ternary composite. If the temperature is higher than the melting point of the nylon component, the fiber is melted and the reinforcement by the fiber is lost. If the kneading temperature is lower than the temperature of the polyolefin component of the ternary composite, however, the ternary composite is not distributed in the rubber compound and remains in pellets. During this kneading, a phase transition of the polyolefin and the rubber takes place in the matrix, and the polyolefin is finely distributed in the rubber. The other blended agent is thereafter added and mixed, resulting in the polymer compound of the outermost layer of the core.

Production of Golf Ball

In the present invention the cover can be molded on a core using a known method as well as preliminary-molding and core-molding. For example for a two-piece ball formed of a core and a cover the cover composition is formed into a semi-spherical half-shell in advance and the core is wrapped with two half-shells for press molding at 130–170° C. for 1–5 minutes. Alternatively, the cover composition described above may be injection-molded directly onto the core to wrap the core. The cover has a thickness of 0.3–3.0 mm. If less than 0.3 mm, the cover is likely to crack when hit repeatedly. If more than 3.0 mm, the shot feeling becomes worse. Furthermore, at the time of molding the cover, a number of dimples are formed on the surface as necessary. The golf ball of the present invention is normally finished with paint, stamped with marking, etc. in order to improve the appearance to increase a market value for introduction in the market.

The golf ball of the present invention uses a thread-wound core, a single-layered or multi-layered solid core, and may be employed in either a thread-wound ball or a solid ball. The golf ball in accordance with the present invention is normally designed to have a diameter in the range of 42.67–43.00 mm and a weight in the range of 45.00–45.93 g.

When the present golf ball compressed under a load of 98N (10 kg) to 1275N (130 kg), it deforms in a range of 2.0–4.0 mm, preferably 2.5 mm-3.5 mm. If less than 2.0 mm, the shot feel tends to be deteriorated. On the other hand, if more than 4.0, soft feel is provided at impact and the rebound property is adversely effected.

EXAMPLES

Examples 1–7 and Comparative Examples 1–4

(1) Production of the Core

As shown in Table 1, two types of core rubber compounds using polybutadiene rubber as a main component were kneaded and adjusted, and then introduced into a die and vulcanized and molded therein at 170° C. for 15 minutes to produce a spherical solid core having a diameter of 41.2 mm. The solid core provides deformation under compression, as represented in millimeters, as shown in Table 1.

TABLE 1

| | Core Formulation | |
|---|---|---|
| core formulation | A | B |
| BR-18 [1] | 100 | 100 |
| zinc acrylate | 33 | 33 |
| zinc oxide | 13.0 | 15.0 |
| diphenylsulfide [2] | 0.5 | 0.5 |
| dicumyl peroxide [3] | 1.0 | 1.0 |
| core diameter (mm) | 41.2 | 41.2 |
| vulcanization conditions | 170° C. for 15 min. | 170° C. for 15 min. |

TABLE 1-continued

| | Core Formulation | |
|---|---|---|
| core formulation | A | B |
| deformation under compression (mm) | 2.90 | 2.85 |

[1] high-cis-polybutadiene produced by JSR Corporation
[2] produced by Sumitomo Seika Chemical Co., Ltd
[3] produced by NOF Corporation Note that blended agents shown in Table 1 are as follows:
1) BR-18: high-cis-polybutadiene rubber produced by JSR Corporation
2) diphenylsulfide: produced by Sumitomo Seika Chemical Co., Ltd.
3) dicumyl peroxide: produced by NOF Corporation.

(2) Preparation of Compound for Cover

Of the cover compositions shown in Table 2, the blends other than blends Nos. 4, 8 and 9 were each kneaded and thereafter molded into a pair of half shells which were in turn arranged around the cover and pressed to form a golf ball. In doing so, it was vulcanized at 150 degrees centigrade for 20 minutes and at 165 degrees centigrade for 8 minutes. For blends Nos. 4, 8 and 9, a core is covered by a cover injection-molded. Thereafter, a surface is painted to complete a golf ball having a diameter of 42.8 mm and a weight of 45.4 g. The blended components were partially identical to Table 1.

TABLE 2

| | Cover Formulation | | | | | | | | | | |
|---|---|---|---|---|---|---|---|---|---|---|---|
| | 1 | 2 | 3 | 4 | 5 | 6 | 7 | 8 | 9 | 10 | 11 |
| BR-18 [1] | 100 | 100 | 100 | — | 100 | 100 | 100 | — | — | 100 | 100 |
| zinc acrylate | 28 | 28 | 28 | — | 28 | 18 | 38 | — | — | 28 | 28 |
| zinc oxide | 12 | 12 | 12 | — | 12 | 14 | 6 | — | — | 12 | 12 |
| titanium oxide | 4 | — | — | — | 4 | 4 | 4 | 4 | 4 | 4 | 4 |
| dicumylperoxide [2] | 0.9 | 0.9 | 0.9 | — | 0.9 | 0.9 | 0.9 | — | — | 0.9 | 0.9 |
| SHP LA1060 [3] | — | 15 | 30 | — | — | 15 | 15 | — | — | 5 | 40 |
| short nylon fiber [4] | — | — | — | — | 15 | — | — | — | — | — | — |
| Hi-Milan 1855 [5] | — | — | — | 50 | — | — | — | — | — | — | — |
| Hi-Milan 1856 [6] | — | — | — | 50 | — | — | — | — | — | — | — |
| Hi-Milan 1605 [7] | — | — | — | — | — | — | — | — | 50 | — | — |
| Hi-Milan 1706 [8] | — | — | — | — | — | — | — | — | 50 | — | — |
| Surlyn 9320 [9] | — | — | — | — | — | — | — | 100 | — | — | — |
| surface hardness (Shore D) | 53 | 52 | 51 | 54 | 50 | 42 | 62 | 40 | 62 | 51 | 58 |
| specific gravity | 1.11 | 1.11 | 1.11 | 0.99 | 1.11 | 1.11 | 1.11 | 0.99 | 0.99 | 1.11 | 1.11 |

[1] high cis polybutadiene produced by JSR Corporation

[2] produced by NOF Corporation

[3] SHP LA1060: short-fiber reinforced, composite material formed of a rubber/polyolefin/nylon, ternary graft copolymer produced by Daiwa Polymer

[4] short nylon fiber having a length of 5 mm and a diameter of 20 $\mu$m

[5] Hi-Milan 1855: ionomer of an Zn neutralized, ethylene-methacrylic acid-butyl acrylate, ternary copolymer produced by Du Pont-Mitsui Polychemicals Co., Ltd.

[6] Hi-Milan 1856. ionomer of an Na neutralized, ethylene-methacrylic acid-butyl acrylate, ternary copolymer produced by Du Pont-Mitsui Polychemicals Co., Ltd.

[7] Hi-Milan 1605: ionomer of an Na neutralized, ethylene-methacrylic acid, binary copolymer produced by Du Pont-Mitsui Polychemicals Co., Ltd.

[8] Hi-Milan 1706: ionomer of an Zn neutralized, ethylene-methacrylic acid, binary copolymer produced by Du Pont-Mitsui Polychemicals Co., Ltd.

[9] Surlyn 9320: ionomer of an Zn neutralized, ethylene-methacrylic acid-butyl acrylate, ternary copolymer produced by Du Pont Performance Estimation A golf ball thus obtained was estimated in resistance to abrasion, resistance to wear, and deferability when compressed.

(1) Resistance to Abrasion

A swing robot of True Temper Sports which had a pitching wedge attached thereto and was set to provide a head speed of 36 m/sec was used to hit each golf ball at two portions. The two struck portions were observed in accordance with the following criterion:

○: a scratch is left on the ball surface slightly enough to be ignored.

Δ: a scratch is clearly left on the ball surface and scuffing is slightly found.

x: the ball surface is considerably scratched and scuffing is obvious.

(2) Wear Resistance

Taper wear was measured according to ASTM D-1044. The smaller the numerical value is, the better the wear resistance is.

(3) Deformation Under Compression

The core or the golf ball was subjected to an initial load of 98N and a final load of 1275N for measurement of deformation, as represented in millimeters.

(4) Core Hardness

Shore D hardness was measured with a spring-type hardness Shore D tester as defined in accordance with ASTM-D2240.

Result of Estimation

Table 3 shows results of estimation of the golf balls of examples 1–7 and those of comparative examples 1–4.

to provide some improvement in resistance to abrasion and resistance to wear.

The present golf ball can include a cover formed of a compound formed mainly of diene rubber, crosslinked with a co-crosslinking agent and furthermore employing an organic short fiber, a ternary composite in particular, as a reinforcement member to maintain rebound performance attributed to polybutadiene and also improve resistance to abrasion and resistance to wear.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A golf ball formed of a core and a cover arranged to cover said core, wherein said cover is formed of a compound containing relative to 100 parts by mass of a polymer component thereof composed mainly of polybutadiene rubber, 1–30 parts by mass of a reinforcement material formed of organic short fiber and 10–40 parts by mass of a metallic salt of α,β-ethylene unsaturated carboxylic acid, wherein said organic short fiber is a ternary composite formed of a rubber component, a polyolefin component and a nylon component.

2. The golf ball of claim 1, wherein said metallic salt of α,β-ethylene unsaturated carboxylic acid is zinc acrylate, zinc methacrylate, magnesium acrylate or magnesium methacrylate.

3. The golf ball of claim 1, wherein the metallic salt of α,β-ethylene unsaturated carboxylic acid is present in an amount of 15–30 parts by mass.

4. The golf ball of claim 1, wherein the reinforcement material is present in an amount of 2–25 parts by mass.

TABLE 3

| | Properties of Golf Ball | | | | | | | | | | |
|---|---|---|---|---|---|---|---|---|---|---|---|
| | examples | | | | | | | comparative examples | | | |
| | 1 | 2 | 3 | 4 | 5 | 6 | 7 | 1 | 2 | 3 | 4 |
| core formulation | A | A | A | A | A | A | A | A | B | A | A |
| core diameter (mm) | 41.2 | 41.2 | 41.2 | 41.2 | 41.2 | 41.2 | 41.2 | 41.2 | 41.2 | 41.2 | 41.2 |
| cover formulation | 2 | 3 | 6 | 7 | 10 | 11 | 5 | 1 | 4 | 8 | 9 |
| cover hardness (Shore D) | 52 | 51 | 42 | 62 | 51 | 58 | 50 | 53 | 54 | 40 | 62 |
| cover thickness (mm) | 0.8 | 0.8 | 0.8 | 0.8 | 0.8 | 0.8 | 0.8 | 0.8 | 0.8 | 0.8 | 0.8 |
| deformation under compression (mm) | 2.75 | 2.80 | 2.83 | 2.58 | 2.79 | 2.68 | 2.81 | 2.70 | 2.65 | 2.85 | 2.52 |
| resistance to abrasion | ○ | ○ | ○ | Δ | ○ | Δ | ○ | Δ | x | x | x |
| resistance to wear | 20 | 20 | 15 | 30 | 25 | 40 | 25 | 50 | 100 | 110 | 80 |

The first comparative example, excluding the reinforcing organic short fiber member from the cover's composition, is inferior in resistance to abrasion and resistance to wear. The second to fourth comparative examples, using ionomer resin to form the cover, provide low resistance to abrasion, low resistance to wear, and low coefficients of restitution.

It can be understood that the first to sixth examples, containing a ternary composite in the reinforcement member to form the cover, are all excellent in resistance to abrasion and resistance to wear. The seventh example, using a reinforcement member formed of short nylon fiber, is observed 5. The golf ball of claim 1, wherein the reinforcement material is present in an amount of 5–20 parts by mass.

6. The golf ball of claim 1, wherein the organic short fiber has a length in the range of 5 μm–10 mm and a diameter in the range of 0.5 to 100 μm.

7. The golf ball of claim 1, wherein the organic short fiber has a length in the range of 100 μm–5 mm and a diameter in the range of 1 to 30 μm.

* * * * *